US009628348B2

United States Patent
Nadgir

(10) Patent No.: US 9,628,348 B2
(45) Date of Patent: *Apr. 18, 2017

(54) POLICY DRIVEN AUTO-TRANSITIONING FRAMEWORK FOR GOVERNED OBJECTS IN SERVICE REGISTRIES

(71) Applicant: International Business Machines Corporation, Armonk, NY (US)

(72) Inventor: Devaprasad K. Nadgir, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 14/058,264

(22) Filed: Oct. 20, 2013

(65) Prior Publication Data

US 2015/0067121 A1  Mar. 5, 2015

Related U.S. Application Data

(63) Continuation of application No. 14/018,523, filed on Sep. 5, 2013, now Pat. No. 9,363,150.

(51) Int. Cl.
*G06F 17/30* (2006.01)
*H04L 12/24* (2006.01)
*H04L 29/08* (2006.01)

(52) U.S. Cl.
CPC ........ *H04L 41/50* (2013.01); *G06F 17/30082* (2013.01); *G06F 17/30289* (2013.01); *G06F 17/30861* (2013.01); *H04L 67/16* (2013.01)

(58) Field of Classification Search
CPC ................... G06F 17/30082; G06F 17/30289
USPC ........................................... 707/694
See application file for complete search history.

(56) References Cited

U.S. PATENT DOCUMENTS

| | | |
|---|---|---|
| 2002/0174191 A1* | 11/2002 | Robertson et al. ........... 709/217 |
| 2005/0027871 A1* | 2/2005 | Bradley et al. ............... 709/227 |
| 2010/0250320 A1* | 9/2010 | Channabasavaiah et al. .... 705/9 |
| 2014/0230006 A1* | 8/2014 | Burke et al. ...................... 726/1 |

* cited by examiner

*Primary Examiner* — Mark E Hershley
(74) *Attorney, Agent, or Firm* — Steven M. Greenberg, Esq.; CRGO Law

(57) ABSTRACT

A method for automated policy-driven transitioning of governed objects in a service registry is provided. The method includes receiving a request in a service registry executing in memory of a host server computing system to persist a governed object of a service registry. The method also includes identifying a policy to be applied to the governed object in response to the receipt of the request. The method yet further includes applying the policy to the governed object and determining whether or not the application of the policy has been successful. Finally, the method includes triggering a transition of the governed object from a contemporaneous state to a new state in the service registry if the application of the policy has been successful. In this way, governed objects of the service registry can be transitioned from one state to the other driven by policies in an automated way.

8 Claims, 2 Drawing Sheets

POLICY DRIVEN AUTO-TRANSITIONING FRAMEWORK FOR GOVERNED OBJECTS IN SERVICE REGISTRIES

CROSS-REFERENCE TO RELATED APPLICATIONS

This application is a Continuation of U.S. application Ser. No. 14/018,523, filed Sep. 5, 2013, currently pending, the entirety of which is incorporated herein by reference.

BACKGROUND OF THE INVENTION

Field of the Invention

The present invention relates to governed objects in a service registry and more particularly to the transitioning of governed objects in a service registry.

Description of the Related Art

The reuse of services greatly depends on the ability to describe and publish the offered functionality of the services to potential consumers. A service registry supports the organization of information about services and provide facilities to publish and discover services. Universal Description Discovery and Integration (UDDI) and the Web Services Description Language (WSDL), together with the simple object access protocol (SOAP) are standards for describing services and their providers, as well as how services can be consumed.

The service registry provides functionality to store and retrieve service-metadata. In this regard, WSDL, extensible markup language (XML) schema definition (XSD), and service component architecture (SCA) modules and policy documents can be loaded and parsed into separate entities. For example with a WSDL document, separate entities are created for service, binding, portType and the like. XML and binary documents can be loaded as single entities. These entities can then be decorated with additional data in the form of properties, classifications and relationships.

Of note, entities within a service registry can be managed using lifecycles defined according to State Adaptive Choreography Language (SACL) in order to provide service governance. The lifecycle can track the state of a service, for example through development, testing, quality assurance and production, allowing for approval and checks before moving to the next stage. As such, "governed objects" within a service registry are entities or instantiation of entities that have associated therewith a lifecycle. Further, governed objects experience the lifecycle by way of different states and transitions therebetween. As such, lifecycle states and transitions defined for a governed object in a service registry uniquely identifies the nature of the governance framework in an organization.

A shortcoming in the current lifecycle definitions of governed objects in service registries is the ability to transition objects from one state to the other driven by policies in an automated way. In other words, based on the result of a policy or policy sets, an object in the service registry automatically moves from its current state to the next state. Yet, the manual nature of the number of checks on each service version object which relates to interfaces, operations, input, output, charters and the like and then the transitioning of the object from one state to the other based on these checks is a painfully laborious, time consuming and inefficient process. Consequently, the service registry can become unusable for the customer, as the number of services in use by the customer increases.

BRIEF SUMMARY OF THE INVENTION

Embodiments of the present invention address deficiencies of the art in respect to the transitioning of governed objects and provide a novel and non-obvious method, system and computer program product for automated policy-driven transitioning of governed objects in a service registry. In an embodiment of the invention, a method for automated policy-driven transitioning of governed objects in a service registry is provided. The method includes receiving a request in a service registry executing in memory of a host server computing system to persist a governed object of a service registry. The method also includes identifying a policy to be applied to the governed object in response to the receipt of the request. The method yet further includes applying the policy to the governed object and determining whether or not the application of the policy has been successful. Finally, the method includes triggering a transition of the governed object from a contemporaneous state to a new state in the service registry if the application of the policy has been successful. In this way, governed objects of the service registry can be transitioned from one state to the other driven by policies in an automated way.

In one aspect of the embodiment, the policy is identified within a configuration table correlating the governed object to the policy. In this regard, the configuration table can provide a uniform resource identifier (URI) referencing the policy. Also, the configuration table can map different selections of governed objects in an XML path (XPATH) expression to one or more policies. Yet further, the configuration table can specify a particular transition for the governed object. Even yet further, the configuration table can specify when an application of the policy to the governed object is considered successful according to a result produced by the application of the policy. Finally, the table can correlate the governed object to the policy based upon an object type of the governed object and a contemporaneous state of the governed object.

In another embodiment of the invention, a service registry and repository data processing system can be configured for automated policy-driven transitioning of governed objects in a service registry. The system can include a service registry executing in memory of a host server computing system and a policy selection configuration table coupled to the service registry. The system also can include an auto transition module coupled to the service registry. The module can include program code enabled to respond to a request in the service registry to persist a governed object of a service registry by identifying a policy in the configuration table to be applied to the governed object, to apply the policy to the governed object and to determine whether or not the application of the policy has been successful, and to trigger a transition of the governed object from a contemporaneous state to a new state in the service registry if the application of the policy has been successful.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automated policy-driven transitioning of governed objects in a service registry. In accordance with an embodiment of the invention, a governed object can be stored into a service registry in response to which one or more policies can be retrieved for the governed object. The policies that are retrieved can be executed against the governed object. Thereafter, the governed object can be transitioned according to an associated pre-stored transition to the extent that the execution of the policies do not produce errors. Otherwise, if errors are produced by the execution of the policies, the governed object is not transitioned.

Figure 1:
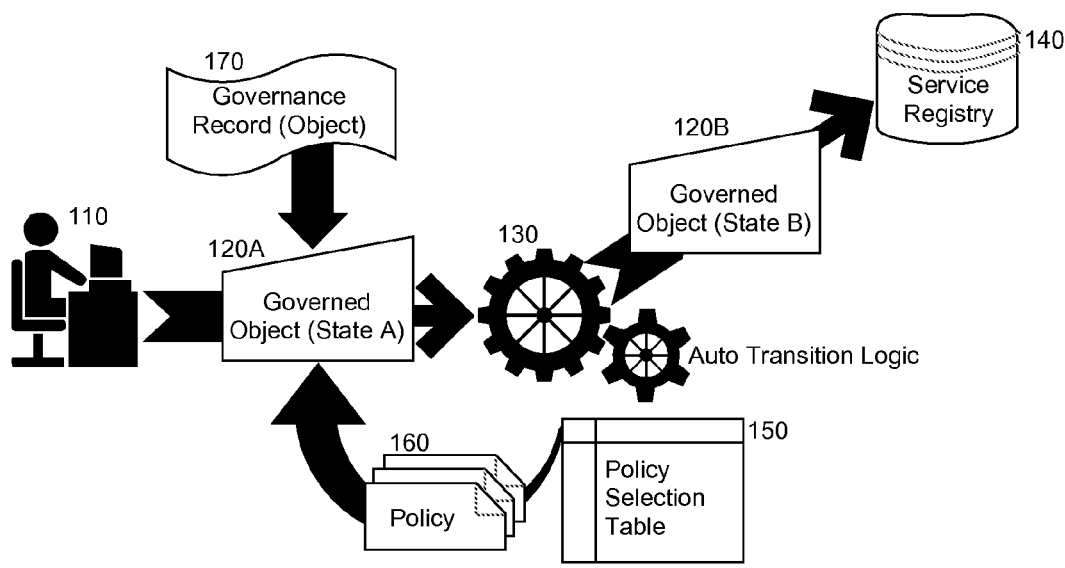
FIG. 1 is a pictorial illustration of a process for automated policy-driven transitioning of governed objects in a service registry.

In further illustration, FIG. 1 pictorially shows a process for automated policy-driven transitioning of governed objects in a service registry. As shown in FIG. 1, an end user 110 can persist a governed object 120A to a service registry 140. Auto transition logic 130 can identify within a policy selection table 150 one or more different policies 160 to be applied to the governed object 120A based upon the nature of the governed object 120A such as a type of the governed object 120A, and the contemporaneous state of the governed object 120A. To the extent that the application of the policies 160 to the governed object 120A according to a corresponding governance record 170 produce no errors, the auto transition logic 130 can transition the state of the governed object 120A to a governed object of a new state 120B.

Figure 2:
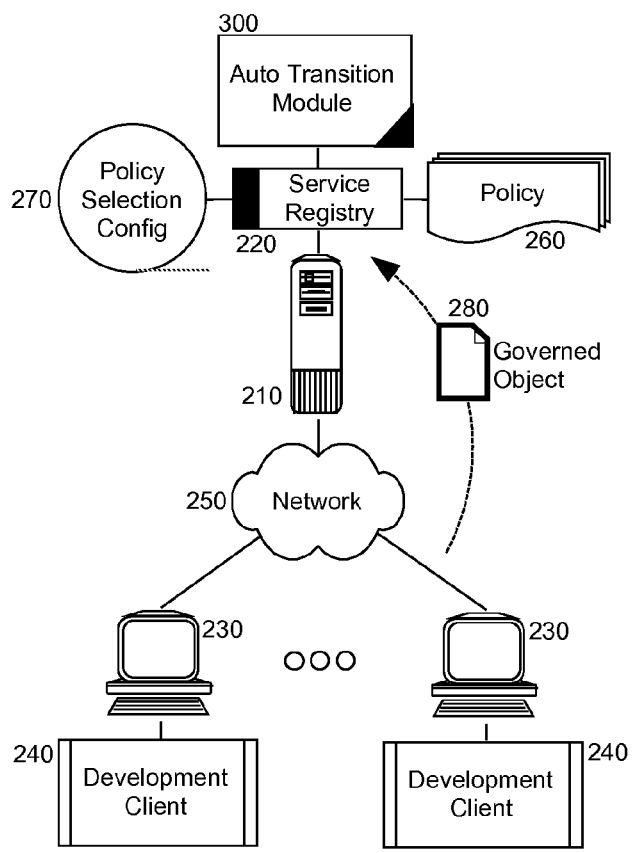
FIG. 2 is a schematic illustration of a service registry and repository data processing system configured for automated policy-driven transitioning of governed objects; and, FIG. 3 is a flow chart illustrating a process for automated policy-driven transitioning of governed objects in a service registry.

The process described in connection with FIG. 1 can be implemented within a service registry and repository data processing system. In yet further illustration, FIG. 2 is a schematic illustration of a service registry and repository data processing system configured for automated policy-driven transitioning of governed objects. The system can include a host server computing system 210 that includes one or more host servers each with memory and at least one processor. The host server computing system 210 can be communicatively coupled to different client computers 230 over computer communications network 250.

The host server computing system 210 can support the execution of a service registry 220 in which different governed objects of a services oriented architecture (SOA) can be registered for access by other computational processes over the computer communications network 250. Of note, an auto transition module 300 can be coupled to the service registry 220 and can access a policy selection configuration 270. The policy selection configuration 270 can include a mapping of object types and associated policy uniform resource identifiers (URIs) of different policies 260.

Optionally, an XML path (XPATH) query for the service registry 220 can be provided to define a set of governed objects mapped to one or more of the policies 260. Further, the policy selection configuration 270 can map results from the execution of the policies 260 to an indication of success or failure, the latter being an error condition. Yet further, the policy selection configuration 270 can map different governed objects to transitional logic by way of one or more URIs to the logic implementing a transition of a corresponding one or more governed objects. Finally, the policy selection configuration 270 can specify messaging topic subscriptions, e-mail addresses and the like to which notifications are to be provided in response to the transitioning of a governed object from one state to another.

The auto transition module 300 can include program code that when executed in memory of the host server computing system 210, can respond to a directive to persist into the service registry 220 a governed object 280 by a development client 240 by identifying one or more of the policies 260 to be applied to the governed object 280 as set forth by a policy selection configuration 270 in order to determine whether or not to transition the governed object 280 from one state to another. To the extent that the application of the policies 260 to the governed object 260 produce no errors, the program code of the auto transition module 300 can trigger the transitioning of the governed object 280 from a contemporaneous state to a new state.

Figure 3:
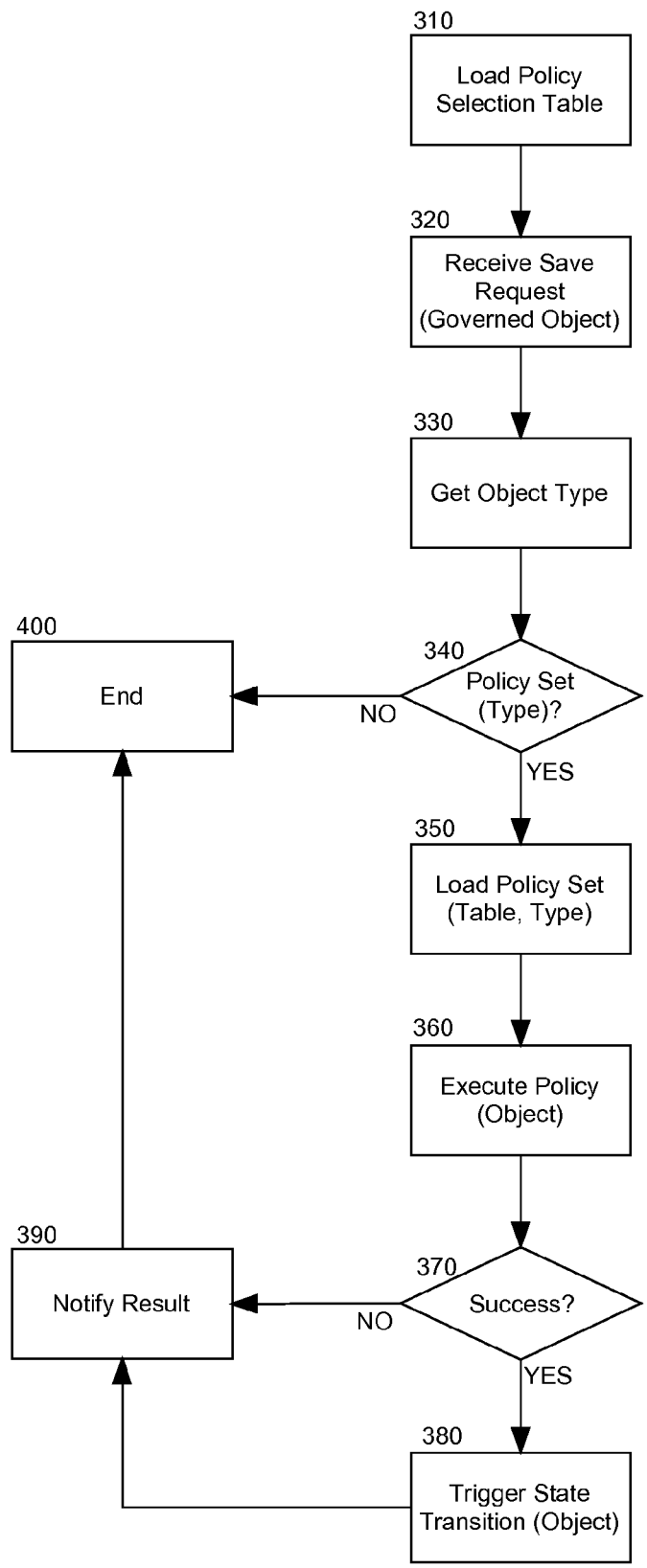

In even yet further illustration of the operation of the auto transition module 300, FIG. 3 is a flow chart illustrating a process for automated policy-driven transitioning of governed objects in a service registry. Beginning in block 310, a policy selection configuration can be loaded into memory and in block 320 a request to persist a governed object of the service registry. In block 330, a type of the governed object can be determined and in decision block 340, it can be determined by reference to the policy selection configuration whether or not one or more policies are accessible to the service registry are available for application to the governed object. If so, in block 350 one or more identified policies in the policy selection configuration can be selected for application to the governed object and in block 360, the policies in the set can be executed against the governed object.

In decision block 370, it can be determined whether the application of the policies to the governed object has been deemed successful according to the policy selection configuration, or whether the application of the policies to the governed object has resulted in error. In decision block 370, if it is determined that the application of the policies to the governed object has been successful, in block 380 a state transition set forth in the policy selection configuration for the governed object can be triggered. Thereafter, in block 390 a result of the application of the policies can be reported through a notification mechanism set forth in the policy selection configuration and the process can complete in block 400.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for automated policy-driven transitioning of governed objects in a service registry, the method comprising:

receiving a request in a service registry executing in memory of a host server computing system to persist a governed object of a service registry;

identifying a policy to be applied to the governed object in response to the receipt of the request;

applying the policy to the governed object and determining whether or not the application of the policy has been successful; and, triggering a transition of the governed object from a contemporaneous state to a new state in the service registry if the application of the policy has been successful.

2. The method of claim 1, wherein the policy is identified within a configuration table correlating the governed object to the policy.

3. The method of claim 2, wherein the configuration table provides a uniform resource identifier (URI) referencing the policy.

4. The method of claim 2, wherein the configuration table maps different selections of governed objects in an extensible markup language (XML) path (XPATH) expression to one or more policies.

5. The method of claim 2, wherein the configuration table specifies a particular transition for the governed object.

6. The method of claim 2, wherein the configuration table specifies when an application of the policy to the governed object is considered successful according to a result produced by the application of the policy.

7. The method of claim 2, wherein the table correlates the governed object to the policy based upon an object type of the governed object and a contemporaneous state of the governed object.

8. The method of claim 2, further comprising transmitting a notification of an outcome of an application of the policy to the governed object utilizing a messaging medium set forth in the configuration table.

* * * * *